Aug. 17, 1926.  
W. E. WHIPP  
1,596,700  
CLUTCH ACTUATING DEVICE FOR LATHES  
Filed June 21, 1924  2 Sheets-Sheet 1
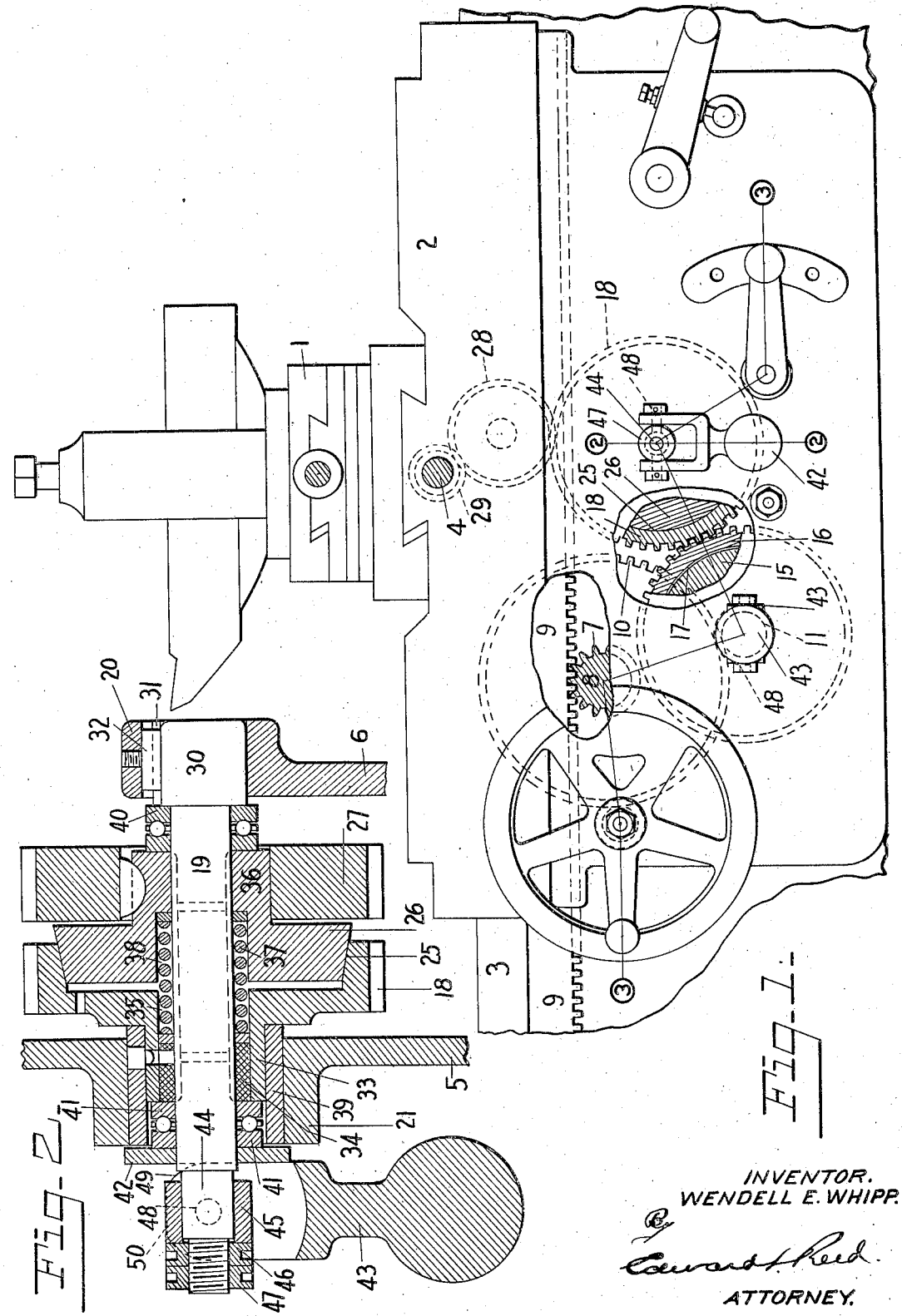
INVENTOR.  
WENDELL E. WHIPP.  
ATTORNEY.

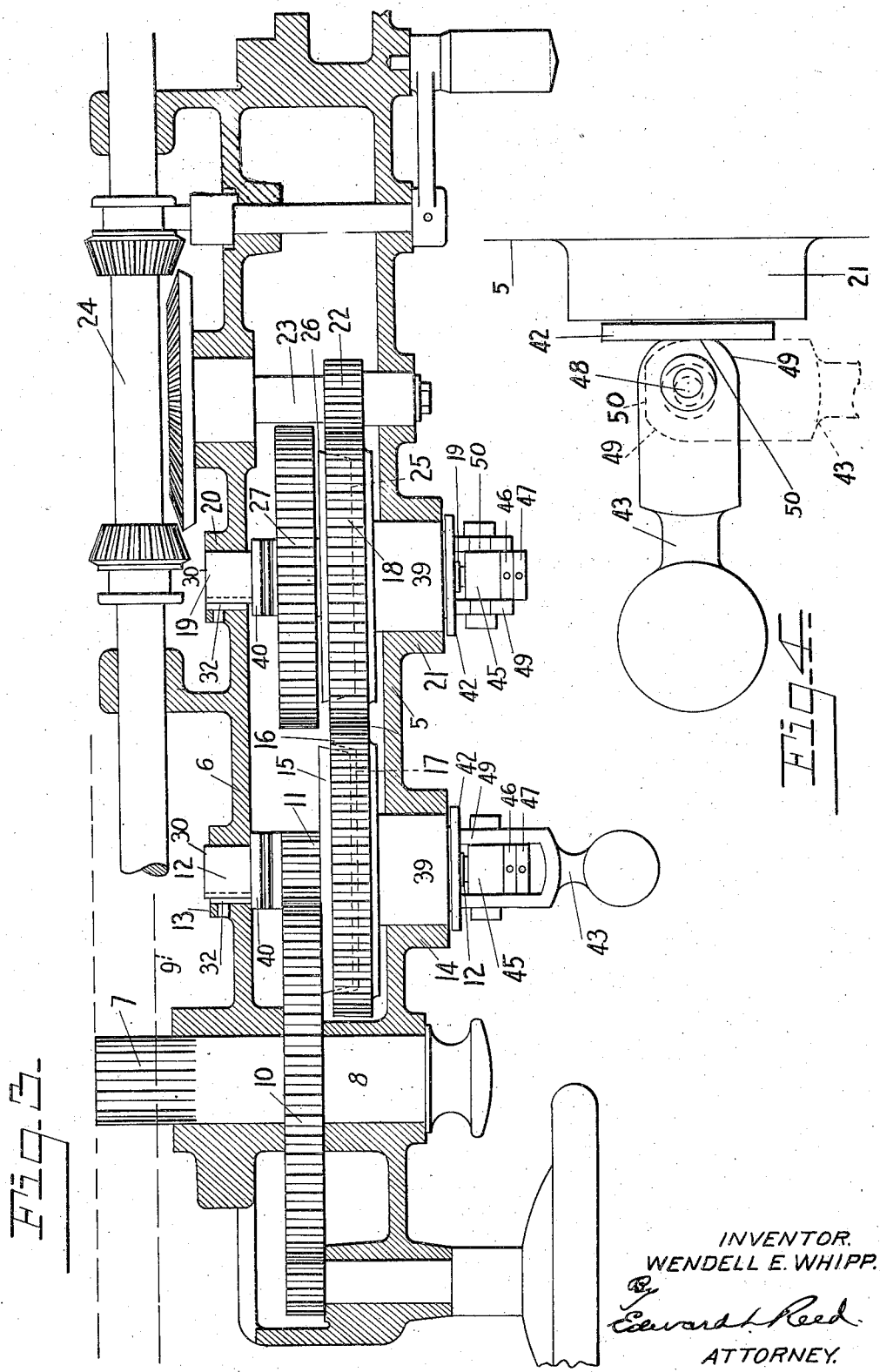

Patented Aug. 17, 1926.

1,596,700

UNITED STATES PATENT OFFICE.

WENDELL E. WHIPP, OF SIDNEY, OHIO, ASSIGNOR TO THE MONARCH MACHINE TOOL COMPANY, OF SIDNEY, OHIO, A CORPORATION OF OHIO.

CLUTCH-ACTUATING DEVICE FOR LATHES.

Application filed June 21, 1924. Serial No. 721,466.

This invention relates to a clutch actuating device for lathes.

In an engine lathe as ordinarily constructed the longitudinal and transverse movement of the tool support is controlled through friction clutches which are screw operated, usually by small hand wheels mounted on the end of the screw threaded rods. In clutch actuating devices of this character it is difficult to exert upon the friction clutch members sufficient pressure to provide a positive driving connection which will prevent slipping of the clutches under a heavy load, as when a heavy cut is being made. Further, when the friction members have been tightly engaged it is difficult to disconnect the same and release the tool holder from further movement. This operation frequently requires considerable time and often results in the delayed operation of the clutch which causes damage to the work.

One object of the present invention is to provide a clutch operating device which can be quickly and easily operated to move the clutch members into or out of operative engagement and which will be of such a character that a strong pressure can be exerted on the clutch members to provide the desired frictional contact.

A further object of the invention is to provide a device of this kind which will be simple in its construction, positive in its operation and which can be applied to mechanisms of standard construction without material modification thereof.

A further object of the invention is to provide a device of this kind comprising an actuating lever which can be shifted to that position in which it may be most readily operated and which can be moved in either direction from an intermediate position to move the clutch members into operative engagement.

Other objects of the invention will appear as the device is described in detail.

In the accompanying drawings Fig. 1 is a side elevation, partly broken away, of the apron of an engine lathe with its associated parts; Fig. 2 is a sectional view taken on the line 2—2 of Fig. 1, through one of the clutches and its operating device; Fig. 3 is a sectional view taken on the line 3—3 of Fig. 1; and Fig. 4 is a side elevation of the clutch operating lever showing the same in its normal position.

In these drawings I have illustrated one embodiment of my invention and have shown the same as applied to a lathe mechanism of well known construction but it will be understood that the invention may be applied to mechanisms of various kinds and that the actuating device itself may take various forms without departing from the spirit of the invention.

In these drawings I have shown only that part of the lathe mechanism with which the invention is directly connected. As here shown, the tool holder 1 is mounted upon a carriage 2, and is slidably mounted for movement transversely to the carriage, and this movement is imparted thereto by a screw shaft 4. Connected with the carriage 2 and depending therefrom is an apron comprising a front plate 5 and a rear plate 6, these plates being rigidly connected one to the other and with the carriage. Longitudinal movement is imparted to the carriage by means of a pinion 7, carried by a shaft 8, which is journaled in the apron, and the pinion 7 meshes with a stationary toothed rack 9 rigidly secured to the lathe bed and extending lengthwise thereof. Rigidly secured to the shaft 8 is a gear 10 which meshes with a pinion 11 mounted on a shaft 12, which is supported in bearings 13 and 14, in the two plates constituting the apron. The pinion 11 has rigidly connected therewith a clutch member 15 which cooperates with a second clutch member 16 carried by a gear 17. The gear 17 meshes with a gear 18 mounted on a shaft 19, which is journaled in bearings 20 and 21 in the front and rear plates 6 and 5, respectively, of the apron. The gear 18 in turn meshes with a pinion 22 secured to a shaft 23 journaled in the apron and having geared connection with a driving shaft 24. The gear 18 on the shaft 19 comprises a friction clutch member 25 with which cooperates a second friction clutch member 26 also mounted on the shaft 19 and having rigidly connected therewith a gear 27 which is connected through an intermediate gear 28 with a pinion 29 on the screw shaft 4 which imparts transverse movement to the tool holder. The mechanism so far described is well known in engine lathes and the details of the driving connections need not be further described.

The two clutches and their operating devices, for controlling respectively the longitudinal and transverse movement of the tool holder, are similar in construction and it will be necessary to describe but one of them. The clutch and clutch actuating device for controlling the transverse movement of the tool holder are shown in detail in Fig. 2. As there shown, the shaft 19 is provided with an enlarged end portion 30 which is mounted in the bearing 20 in the rear plate 6 of the apron. This shaft is preferably held against rotation but is capable of a slight axial or longitudinal movement and to this end the enlarged end portion thereof is provided with a keyway 31 to receive a key 32 which is mounted in the bearing 20. The gear 18 is rotatably mounted on the shaft 19 and, as here shown, has an elongated hub 33 provided at its outer or forward end with a bushing 34 to receive the shaft 19 and journaled in a bushing 39 mounted in the bearing 21. The bushing 34 is of less length than the hub and the hub is thus provided at its inner end with a recess 35, the purpose of which will hereinafter appear. The clutch member 25, which is associated with the gear 18, may be connected therewith in any suitable manner but, in the present construction, the gear 18 is a flanged gear and the inner surface of the flange is beveled and constitutes the clutch member, the gear and clutch member being integral. The second clutch member 26 is shown in the form of a tapered disk having a hub portion 36 which is rotatably mounted on the shaft 19 and on which the gear 27 is rigidly mounted so that the clutch member 26 and gear 27 rotate in unison. The clutch member 26 is capable of axial movement with the shaft and the two clutch members are held normally in their separated positions by means of a spring 37 coiled about the shaft 19 and arranged in a recess 35 with the gear 18 and a corresponding recess 38 with the clutch member 26. An end thrust bearing 40 is interposed between the inner end of the hub of the clutch member 26 and the enlarged end 30 of the shaft 19. A second thrust bearing 41 is interposed between the outer end of the hub 33 of the gear 18 and a plate 42, which is mounted about the shaft 19 beyond the end of the bearing 21 and which, in the present construction, is of such a size that it will overlap the outer end of the bearing.

The outer end of the shaft 19 projects beyond the bearing 21 and I have mounted on this projecting end portion of the shaft an actuating lever 43 having a cam shaped portion arranged to engage a part of the mechanism which is fixed against longitudinal movement with the shaft 19, in the present instance the plate 42, so that the movement of the lever about its axis in one direction will impart lengthwise movement to the shaft and to that clutch member which moves with the shaft, thereby bringing the two clutch members into cooperative relation. When the lever is moved in the other direction about its axis the pressure on the shaft is relieved and the spring 37 will move the shaft and its associated clutch member in the opposite direction, thus disconnecting the two clutch members. The actuating lever may be of any suitable character and may be connected with the shaft in various ways. As here shown, the projecting end portion of the shaft is slightly reduced in diameter, as shown at 44, and has mounted thereon a short sleeve or collar 45, this sleeve being rotatably and slidably mounted on the end of the shaft but having its axial movement in an outward direction positively limited by an abutment rigidly secured to the end of the shaft. Preferably this abutment is adjustable so that the position of the sleeve with relation to the shaft may be adjusted to compensate for wear, either on the cam surfaces or on the clutch surfaces. As here shown, the abutment comprises a nut 46 screw threaded onto the end of the shaft beyond the sleeve and held rigidly against displacement by a lock nut 47. The lever 43 is bifurcated and the two arms of the bifurcation embrace the sleeve 45, the sides of which are preferably flattened, and are pivotally mounted on the respective sides of the sleeve, as shown at 48. The end portions of the two arms of the bifurcation, which extend beyond the axis 48 thereof, are cam shaped, as shown at 49, and are of such radii that they will bear against the fixed part of the structure or plate 42. In the present arrangement the shortest radius of the cam surface is at the longitudinal center of the lever and this portion is preferably flattened slightly, as shown at 50, so that when the lever is in substantial alinement with the shaft 19 this flattened portion of the cam surface will be in contact with the plate 42 and will be held firmly against the same by the action of the spring 37, thus retaining the lever in this position until force is applied thereto. The radii of the cam surface increase in length in each direction from the central or end portion thereof so that if the lever is moved in either direction from its intermediate or inoperative position one or the other of the cam surfaces will act on the plate 42 to impart lengthwise movement to the shaft in a direction to move the one clutch member into engagement with the other. The lever being rotatable about the axis of the shaft it will be obvious that it may be moved into any position with relation to the shaft in which it may be most readily operated.

The operation of the device will be readily understood from the foregoing description of the several parts thereof and it will be apparent that by means of the cam lever the clutch may be very quickly and easily operated and that ample pressure may be exerted upon the movable clutch member to secure a positive driving connection which will not slip under heavy loads, and that regardless of the amount of frictional contact between the clutch members, they may be quickly and easily released by restoring the lever to its normal or intermediate position. Further, the operator may move the lever to any position about the axis of the shaft 19 in which it is most convenient for him to operate the same, thus further facilitating the quick and positive operation of the clutch. The device is very simple in its construction and in its operation and is of a strong durable character which will not be easily broken and which will have a long life. Any wear on the cam or friction surfaces may be compensated for by the adjustment of the abutment 46.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a lathe, a tool holder, means for imparting bodily movement to said tool holder comprising a train of gearing, an apron having alined bearings, a shaft slidably but non-rotatably mounted in said bearings and having an end portion projecting beyond the outer end of one of said bearings, two of the gears of said train of gearing being rotatably mounted on said shaft, cooperating clutch members associated with the respective gears, one of said clutch members being movable axially with said shaft, a spring acting on said clutch members to hold them normally in their separated positions, a plate mounted about said projecting end portion of said shaft and held against axial movement relative thereto, a sleeve rotatably mounted on said shaft beyond said plate, an abutment secured to the end of said shaft to hold said sleeve against axial movement relative to said shaft, and a bifurcated lever embracing said sleeve and having its arms pivotally connected with the respective sides thereof, the ends of said arms being cam shaped and arranged to engage said plate, whereby the movement of said lever about its axis in one direction will impart axial movement to said shaft and to that clutch member which is movable with said shaft.

2. In a lathe, a tool holder, means for imparting bodily movement to said tool holder comprising a train of gearing, an apron having alined bearings, a shaft slidably but non-rotatably mounted in said bearings and having an end portion projecting beyond the outer end of one of said bearings, two of the gears of said train of gearing being rotatably mounted on said shaft, cooperating clutch members associated with the respective gears, one of said clutch members being movable axially with said shaft, a spring acting on said clutch members to hold them normally in their separated positions, a plate mounted about said projecting end portion of said shaft and held against axial movement relative thereto, a sleeve rotatably mounted on said shaft beyond said plate, an abutment adjustably mounted on said end portion of said shaft and held normally against axial movement relatively thereto to limit the axial movement of said sleeve, a lever pivotally mounted on said sleeve and having a part arranged to engage said plate and impart axial movement to said shaft when said lever is moved about its axis in one direction.

3. In a lathe, a tool holder, means for imparting bodily movement to said tool holder comprising a train of gearing, an apron having alined bearings, a shaft slidably but non-rotatably mounted in said bearings and having an end portion projecting beyond the outer end of one of said bearings, two of the gears of said train of gearing being rotatably mounted on said shaft, cooperating clutch members associated with the respective gears, one of said clutch members being movable axially with said shaft, a spring acting on said clutch members to hold them normally in their separated positions, a plate mounted about said projecting end portion of said shaft and held against axial movement relative thereto, a sleeve mounted on said shaft beyond said plate, an abutment mounted on said end portion of said shaft to limit the axial movement of said sleeve, and a lever pivotally mounted on said sleeve and having a cam shaped portion to engage said plate and impart axial movement to said shaft when said lever is moved about its axis in one direction.

4. In a lathe, a tool holder, means for imparting bodily movement to said tool holder comprising a train of gearing, an apron having alined bearings, a shaft slidably but non-rotatably mounted in said bearings and having an end portion projecting beyond the outer end of one of said bearings, two of the gears of said train of gearing being rotatably mounted on said shaft, cooperating clutch members associated with the respective gears, one of said clutch members being movable axially with said shaft, a spring acting on said clutch members to hold them normally in their separated positions, a plate mounted about said projecting end portion of said shaft and held against axial movement relative thereto, a sleeve mounted on said shaft beyond said plate, an abutment mounted on said end portion of said shaft to limit the axial movement of said sleeve, and a lever pivotally mounted on said sleeve and having its end portion provided with cam surfaces, one or the other of which will engage said plate and impart axial movement to said shaft when said lever is moved about its axis in either direction from an intermediate position.

5. In a lathe, a tool holder, means for imparting bodily movement to said tool holder comprising a train of gearing, an apron having alined bearings, a shaft slidably but non-rotatably mounted in said bearings and having an end portion projecting beyond the outer end of one of said bearings, two of the gears of said train of gearing being rotatably mounted on said shaft, cooperating clutch members associated with the respective gears, one of said clutch members being movable axially with said shaft, a spring acting on said clutch members to hold them normally in their separated positions, a sleeve mounted on said end portion of said shaft and held normally against axial movement relative thereto, a lever pivotally mounted on said sleeve and having a cam shaped portion to engage a relatively fixed surface and impart axial movement to said shaft when said lever is actuated.

6. In a lathe, a tool holder, means for imparting bodily movement to said tool holder comprising a train of gearing, an apron having alined bearings, a shaft slidably but non-rotatably mounted in said bearings and having an end portion projecting beyond the outer end of one of said bearings, two of the gears of said train of gearing being rotatably mounted on said shaft, cooperating clutch members associated with the respective gears, one of said clutch members being movable axially with said shaft, a spring acting on said clutch members to hold them normally in their separated positions, a plate mounted about said projecting end portion of said shaft and held against axial movement relative thereto, a lever pivotally mounted on said end portion of said shaft and held normally against axial movement relatively thereto, said lever having cam shaped end portions to engage said plate to impart axial movement to said shaft when said lever is actuated.

7. In a machine of the character described, a clutch comprising cooperating friction members, an axially movable shaft on which said friction members are supported, one of said friction members having axial movement with said shaft, a lever pivotally mounted on said shaft, held normally against axial movement relative thereto and having a cam shaped portion, and a part fixed with relation to said shaft and arranged to be engaged by the cam shaped portion of said lever.

8. In a machine of the character described, a clutch comprising cooperating friction members, an axially movable shaft on which said friction members are supported, one of said friction members having axial movement with said shaft, a lever pivotally mounted on said shaft, held normally against axial movement relative thereto and having a cam shaped portion, a part fixed with relation to said shaft and arranged to be engaged by the cam shaped portion of said lever, and means for adjusting the axis of said lever longitudinally of said shaft.

9. In a machine of the character described, a clutch comprising cooperating friction members, an axially movable shaft on which said friction members are supported, one of said friction members having axial movement with said shaft, a sleeve mounted on said shaft and held against axial movement relative thereto in one direction, a lever pivotally mounted on said sleeve and having a cam shaped portion, and a part fixed with relation to said shaft and arranged to be engaged by the cam shaped portion of said lever when the latter is actuated.

10. In a machine of the character described, a clutch comprising cooperating friction members, an axially movable shaft on which said friction members are supported, one of said friction members having axial movement with said shaft, a sleeve rotatably mounted on said shaft and held normally against axial movement thereon in one direction, a lever pivotally mounted on said sleeve and having a cam shaped portion, and a part fixed with relation to said shaft and arranged to be engaged by the cam shaped portion of said lever when the latter is actuated.

11. In a machine of the character described, a clutch comprising cooperating friction members, an axially movable shaft on which said friction members are supported, one of said friction members having axial movement with said shaft, a sleeve rotatably mounted on said shaft and held normally against axial movement thereon in one direction, a bifurcated lever embracing said sleeve and having its arms pivotally connected with the respective sides of said sleeve, said arms having cam shaped portions, and a part fixed with relation to said shaft and arranged to be engaged by said cam shaped portions of said lever when the latter is actuated.

12. In a machine of the character described, a clutch comprising cooperating friction members, an axially movable shaft on which said friction members are supported, one of said friction members having axial movement with said shaft, a sleeve rotatably mounted on said shaft, an abutment screwed onto said shaft to limit the axial movement of said sleeve in one direction, a bifurcated lever embracing said sleeve and having its arms pivotally connected to the respective sides thereof, the ends of the arms of said bifurcated lever having cam shaped portions, and a part fixed with relation to said shaft and arranged to be engaged by the cam shaped portions of said lever when the latter is actuated.

13. In a mechanism of the character described, a supporting structure having alined bearings, a shaft slidably but non-rotatably mounted in said bearings, clutch members rotatably mounted on said shaft, one of said clutch members having axial movement with said shaft, a spring tending to move the last mentioned clutch member in one direction, said shaft having a part projecting beyond one of said bearings, a plate mounted about said shaft and engaging the end of said bearing, a sleeve rotatably mounted on said shaft, an abutment adjustably mounted on the end of said shaft to limit the movement of said sleeve in one direction, and a bifurcated lever embracing said sleeve and having its arms pivotally connected with the respective sides thereof, said arms of said lever having cam shaped portions arranged to engage said plate and impart axial movement to said shaft when said lever is moved in either direction from an intermediate position.

In testimony whereof, I affix my signature hereto.

WENDELL E. WHIPP.